United States Patent [19]
Sims et al.

[11] Patent Number: 5,251,827
[45] Date of Patent: Oct. 12, 1993

[54] PROCESS FOR SEPARATING FIBRES FROM COMPOSITE MATERIALS

[75] Inventors: Bryan Sims, Oakville; Craig A. Booth, Acton; V. I. Lakshmanan, Mississauga, all of Canada

[73] Assignee: Phoenix Fibreglass Inc., Oakville, Canada

[21] Appl. No.: 947,351

[22] Filed: Sep. 18, 1992

[30] Foreign Application Priority Data

Sep. 18, 1991 [GB] United Kingdom ............ 9119944
Jun. 18, 1992 [GB] United Kingdom ............ 9212920

[51] Int. Cl.⁵ .................. B29B 17/00; B29B 17/02; B03B 9/06
[52] U.S. Cl. .................. 241/24; 241/DIG. 38
[58] Field of Search ............ 241/24, DIG. 38, 68, 241/78, 80

[56] References Cited

U.S. PATENT DOCUMENTS

| | | | |
|---|---|---|---|
| 3,941,684 | 3/1976 | Bradbury et al. | 209/3 |
| 4,431,530 | 2/1989 | Syben | 209/138 |
| 4,726,530 | 2/1988 | Miller et al. | 241/24 |
| 4,784,333 | 11/1988 | Hikake et al. | 241/24 |

FOREIGN PATENT DOCUMENTS

| | | | |
|---|---|---|---|
| 14289 | 8/1980 | European Pat. Off. | 241/24 |
| 0068502 | 1/1983 | European Pat. Off. | |
| 0443051 | 8/1991 | European Pat. Off. | |
| 273078 | 1/1978 | Fed. Rep. of Germany | |
| 3037714 | 6/1982 | Fed. Rep. of Germany | 241/24 |
| 2087757 | 6/1982 | United Kingdom | |

OTHER PUBLICATIONS

"Resource Recovery: Technology," J. Campbell et al., Conservation & Recycling, vol. 6, No. 4, 1983, pp. 147-159.

"Recycling of Waste PVC Leather and PVC Urethane in the Automobile Industry," S. Miyama, Conservation & Recycling, vol. 10, No. 4, 1987, pp. 265-271.

Primary Examiner—Douglas D. Watts
Attorney, Agent, or Firm—Ladas & Parry

[57] ABSTRACT

A resin reinforced fibre product such as glass fibre impregnated with a thermosetting resin is treated to recover fibre by initially shredding the waste, pulverizing the shredded waste and sieving the pulverized waste to separate the free fibres. The remaining waste is milled to produce a fine powder suitable as a filler. The pulverizing is completed without classification and a portion of the pulverized product above a nominal cut size recampaigned. Free fibres are separated by an airlift during the sieving process.

18 Claims, 6 Drawing Sheets

PROCESS FOR SEPARATING FIBRES FROM COMPOSITE MATERIALS

The present invention relates to methods and apparatus for treating waste byproducts of fibre-reinforced plastic manufacturing processes.

There is widespread use of fibre reinforced plastics which essentially utilize a fibre substrate impregnated with a thermosetting resin. One of the more popular fibre reinforcements is glass fibre which may be utilized in a mat form, either woven or random, or as chopped fibres distributed within the resin binder.

The manufacturing techniques utilizing fibre reinforced plastics frequently require trimming of the completed product. These trimmings and improperly manufactured products produce a significant waste product which has to be disposed of as landfill. Moreover, once the useful life of the product is over, it has to be disposed of, usually by landfill.

Another product used increasingly in the automotive industry is known as sheet molded compound (SMC) which is used to produce complex shapes for panels, bumpers and the like. These products are mass-produced and inevitably some of the product is not of sufficient quality. Again, therefore, considerable waste product has to be disposed of, both during manufacture and at the end of the product life.

Attempts to utilize the waste byproducts of fibre reinforced plastic have not previously been successful. This is due in part to the fact that most processes that seek to reduce the size of the waste either damage the fibre and/or generate excessive heat which in turn causes the resin to melt and inhibit the process. It is, however, recognized that much of the waste product contains fibre which, if it could be separated from the resin in a relatively undamaged condition, could be reused.

It is therefore an object of the present invention to provide a method and apparatus for separating fibres from fibre reinforced plastic material which obviates or mitigates the above disadvantages.

According to the present invention, there is provided a method of separating fibres from a fibre reinforced plastic material comprising the steps of shredding said material into a plurality of discrete pieces, feeding said pieces into a pulverizer to impact said pieces, and providing an unclassified output from said pulverizer, separating free fibres from said output and feeding at least a portion of the balance of said output to a pulverizer for further diminution thereof.

It has been found that by utilizing a pulverizer of the vertical shaft swing hammer type, known as a fiberizer, a good separation of the fibres from the resin is obtained without generation of excessive heat or undue damage to the fibres.

Preferably, the pulveriser is airswept so that fibres are entrained with the air stream and moved effectively through the pulveriser.

The separation of the free fibre after passing through the pulveriser ensures that the free fibres are not reprocessed by the pulveriser to maintain the maximum length of fibre in the recovered fibre.

Preferably, the portion of the balance of the output that is further processed by the pulveriser is selected to comprise essential unitary pieces of fibre reinforced plastic material so that further processing will separate fibres rather than reprocess already separated fibres.

The use of a shredder to break the material into small discrete pieces of uniform size that facilitates operation of the pulverizer. With certain types of waste there is a significant amount of free fibre that can be separated prior to pulverization, either prior to or after shredding, and which further enhances the operation of the pulverizer.

In one embodiment, the material processed by the pulverizer is cascaded through progressively finer sieves with free fibres being removed at each stage. The resultant byproduct can then be milled to produce a fine powder that may be used as a resin extender or filler with characteristics comparable to commercially available fillers.

It is preferred in a second embodiment to utilize a sieve or trommel to separate free fibres after processing by the pulverizer. A trommel has been found effective to separate free fibre from larger pieces of composite and permit the composite pieces to be recampaigned through a pulverizer.

Embodiments of the invention will now be described by way of example only with reference to the accompanying drawings, in which FIG. 1 is a schematic representation of the process and apparatus for separating fibres from fibre reinforced plastic material;

Figure 1:
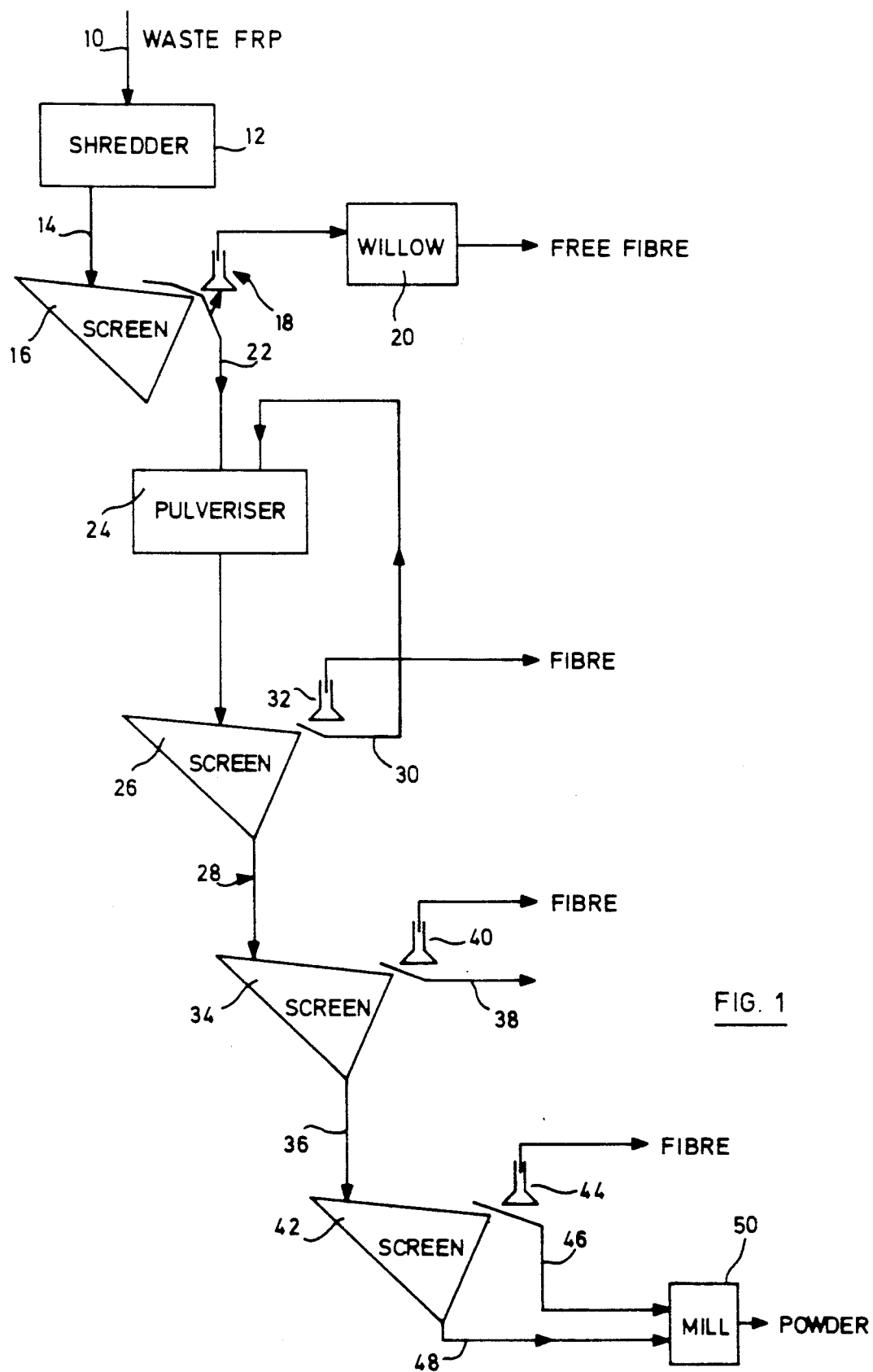

Referring therefore to FIG. 1, waste fibre reinforced plastic material such as fibre glass composites indicated at 10 is introduced into a shredder 12. The waste material can include solidified resin and fibre product as well as fibre cloth or felt that has been trimmed during the manufacturing process.

Shredder 12 is a low speed, high torque shredder of the type utilizing a pair of counter-rotating shafts carrying a plurality of interdigitated hooked blades. Such shredders are available from Shred-Tech Limited of Cambridge, Ontario. The shredder 12 reduces the waste product to discrete pieces typically in the form of elongate strips in the order of 8 cm × 8 cm with the thickness determined by the original feedstock. It has been found that the optimum rake angle of the hooked teeth utilized in the shredder 12 is between 10° and 20° with a rake angle of 15° proving satisfactory when operating at a rotational speed of between 20 rpm and 26 rpm. It has also been found that too great a reduction of the feedstock, for example to 3 cm × 3 cm, in general leads to a reduction in the recovery of longer fibres.

The shredded pieces indicated at 14 are deposited onto a vibrating non-perforated screen 16. Screen 16 causes free fibres that have been released in the shredder 12 to separate from the resin-bound fibres and may be removed by an airlift 18. This fibre has a consistency similar to that sold commercially as 36 mm chopped strand. It has been found that with mixed waste product such as results from hand lay up manufacture in the order of 10% of the initial waste may be released as free fibres by the shredder 1 and extracted through the airlift 18. Further cleansing of the free fibres is provided by a willow 20 and it has been found in experimental tests that free fibres in the order of 88% purity have been obtained from the willow 20.

Figure 2A:
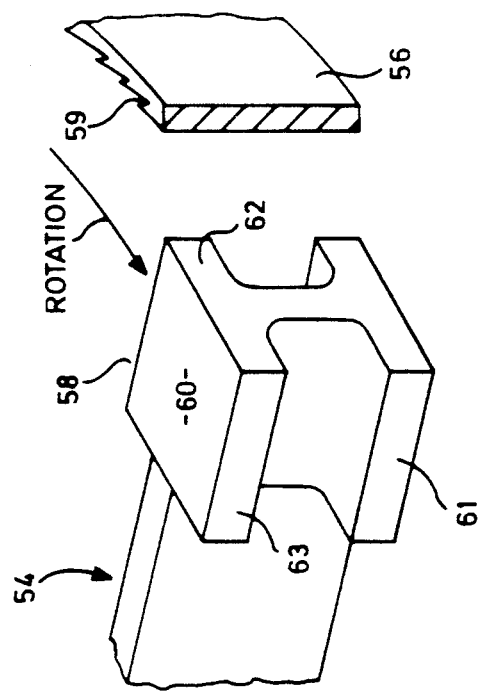
FIG. 2a is a view of a portion of the apparatus shown in FIG. 2 on an enlarged scale.
Figure 2:
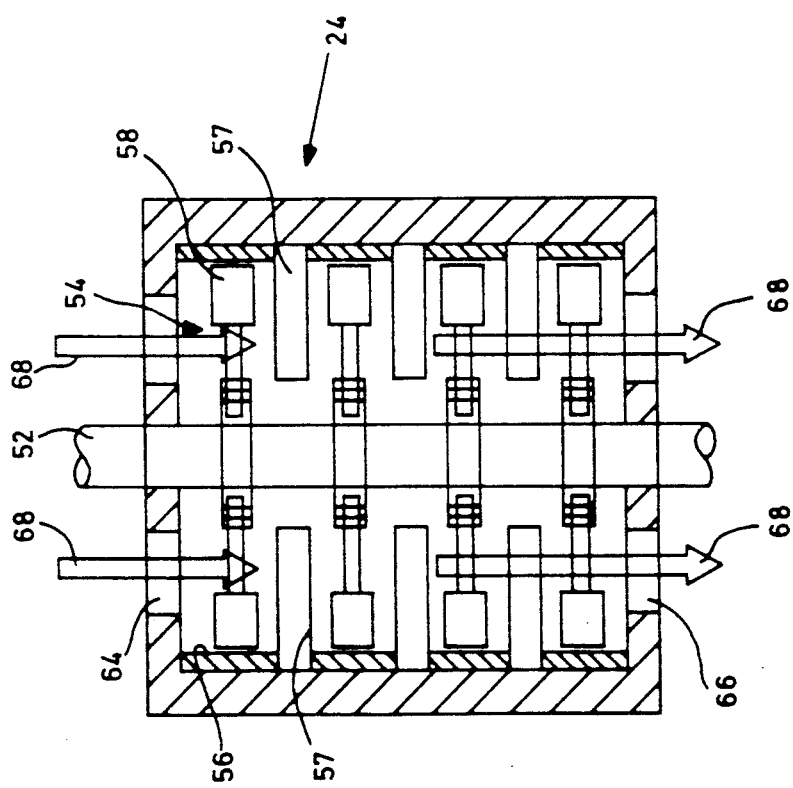
FIG. 2 is a section through apparatus used in the process shown in FIG. 1.

The balance of the waste material as indicated at 22 is delivered to a pulverizer 24 for further separation. Pulverizer 24 is shown in further detail in FIG. 2 and is a vertical shaft swing hammer mill commonly known as a fibreiser. The fibreiser used in the experimental process illustrated in FIG. 1 is a "lab scale Fibreiser" made by Fournier Steel Works, Blacklake, Quebec, and identified as model D6624RE. Pulverizer 24 utilizes a vertical shaft 52 having a plurality of hammers 54 pivotally mounted to the shaft for swinging movement in a horizontal plane. An imperforate breaker plate 56 is disposed about the shaft 52 so that product introduced into the pulverizer is impacted either by the hammers 54 or against the breaker plate 56. Stationary fingers 57 are interposed between the hammers 54. As can be seen from FIG. 2a the radially inner surface of plate 56 is serrated with the generally radial faces 59 directed against the direction of rotation of the shaft 52.

Each of the hammers 54 includes an enlarged head 58 with leading and trailing faces 60,61 respectively an end face 62 and upper and lower faces 63. It is preferred that the included angles at the intersection of each of the faces 60, 61, 62, 63 is 90° and that the edges at the intersection are not radiussed so that a "sharp" edge is provided. It is also preferred that the faces of the head are face hardened by an appropriate conventional process. Material is fed through the pulverizer 24 in a vertical direction from an inlet 64 to an outlet 66. The flow of material is enhanced by entrainment with air, indicated by arrows 68, which carries the product past the hammers 54. The pulverizer 24 does not include a classifying screen as is commonly used in other types of hammer mill so that the material at the outlet 66 is unclassified and has proceeded from the inlet 64 to outlet 66 in a single pass. It is found surprisingly that the use of an unclassified vertical shaft swing hammer type mill effectively separates the fibres from the resin without damaging the fibres.

By contrast, when product was introduced into a ball mill, rod mill or shatterbox, each of which uses a classifying screen, the material was not pulverized but simply polished.

It is believed that the absence of a classifying screen and the consequent single pass pulverization reduces recirculation within the mill and so prevents excessive heating of the material or damage to the fibres. Moveover, it is believed that the action of the hammers leads to a breaking of the material along the fibres and consequently release of the fibres.

In the embodiment of FIG. 1, material from the pulverizer 24 is fed to a vibrating screen 26. The vibrating screen 26 is a 10-mesh screen having a 2.03 mm screen opening defined by 0.51 mm diameter wires. The material delivered from the pulverizer is separated on the screen 26 into the unders indicated at 28 which pass through the screen, the overs 30 which are too large to pass through the screen 26 and free fibre which is extracted by an airlift 32. The free fibre extracted by airlift 32 may be combined with the output from the willow 20 to produce a recovered product of relatively long fibres similar to commercially available 24 mm chopped strands.

The overs 30 from the 10 mesh screen are returned to the pulverizer 24 for further processing and eventual separation on the screen 26.

Unders 28 are delivered as feedstock 33 to a 35-mesh screen 34 having a 0.51 mm screen opening defined by a 0.216 mm diameter wire. Again, the screen separates the feedstock 33 into unders 36 that pass through the screen 34, overs 38 which do not pass through the screen 34, and free fibre separated by an airlift 40. In practice, when using glass fibre reinforced composites, it has been found that the fibre extracted by the airlift 40 can be used as an end product having a consistency similar to that known as 8 mm–12 mm chopped strand sold commercially.

The unders 36 are used as feedstock 37 to a further vibrating screen 42 having a 60-mesh screen with a screen opening of 0.27 mm defined by a 0.152 mm diameter wire. The screen 42 separates further free fibre which is removed through an airlift 44 and delivers the overs 46 and unders 48 to a milling device 50. The fibre extracted by the airlift 44 has a consistency similar to 3 mm milled fibre and typically is 60% pure when the waste product is glass fibre reinforced.

The milling device 50 is a fluid energy mill in which a pair of jets of air entrained particles are caused to impact and disintegrate. Such mills are commonly referred to as micronizers and produce a very fine powder in the order of 10 micron size. The powder has been found suitable for use as an extender or filler in resin used to make fibreglass reinforced products.

From the above, it can be seen that the process provides free fibres which are comparable with commercially available virgin fibres and also produces from the resin a powder suitable for reuse as a filler or extender.

The fibre extracted by the airlift 40 when the waste product includes glass fibre typically has a purity of fibre to resin is in the order of 60% although it is believed that the entrapment of small pieces of resin within the fibre is not detrimental and may even enhance the characteristics of the fibre.

Figure 3:
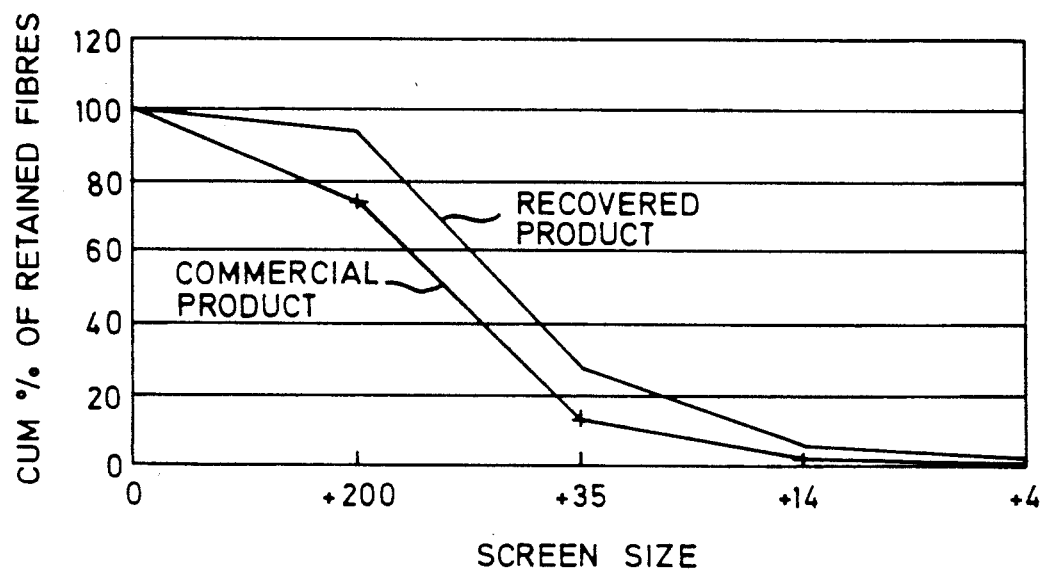
FIG. 3 is a curve comparing the fibre size distribution for a product recovered during the process with a commercially available product.

As shown in FIG. 3, the fibre extracted from the airlift 44 has comparable fibre length characteristics to the commercially available 3 mm milled fibre product and again typically has a 60% purity. The size distribution was obtained with a Bauer McNett test using a wet screen classification.

Further separation of the fibre from the resin can be obtained utilizing willows similar to those indicated at 20 in each of the fibre lines. However, in tests it is found that such willows may reduce the length of the free fibres and therefore may not be desirable.

In tests conducted to date with glass reinforced composites, it would appear that between 30%–40% by weight of the total throughput of the waste is recovered as fibre with the majority being recovered from the 10-mesh screen 26. The output from the mill 50 represents in the order of 20% by weight of the throughput. It can be seen, therefore, that in excess of 50% by weight of the initial waste product is recovered as reusable materials. The above results were obtained using a pulverizer as described above but with radiussed edges at the intersection of the faces 60,61,62,63 for the hammers heads and without face hardening. The use of sharp edges and face hardening have been observed to increase the extraction of the fibre.

Figure 4:
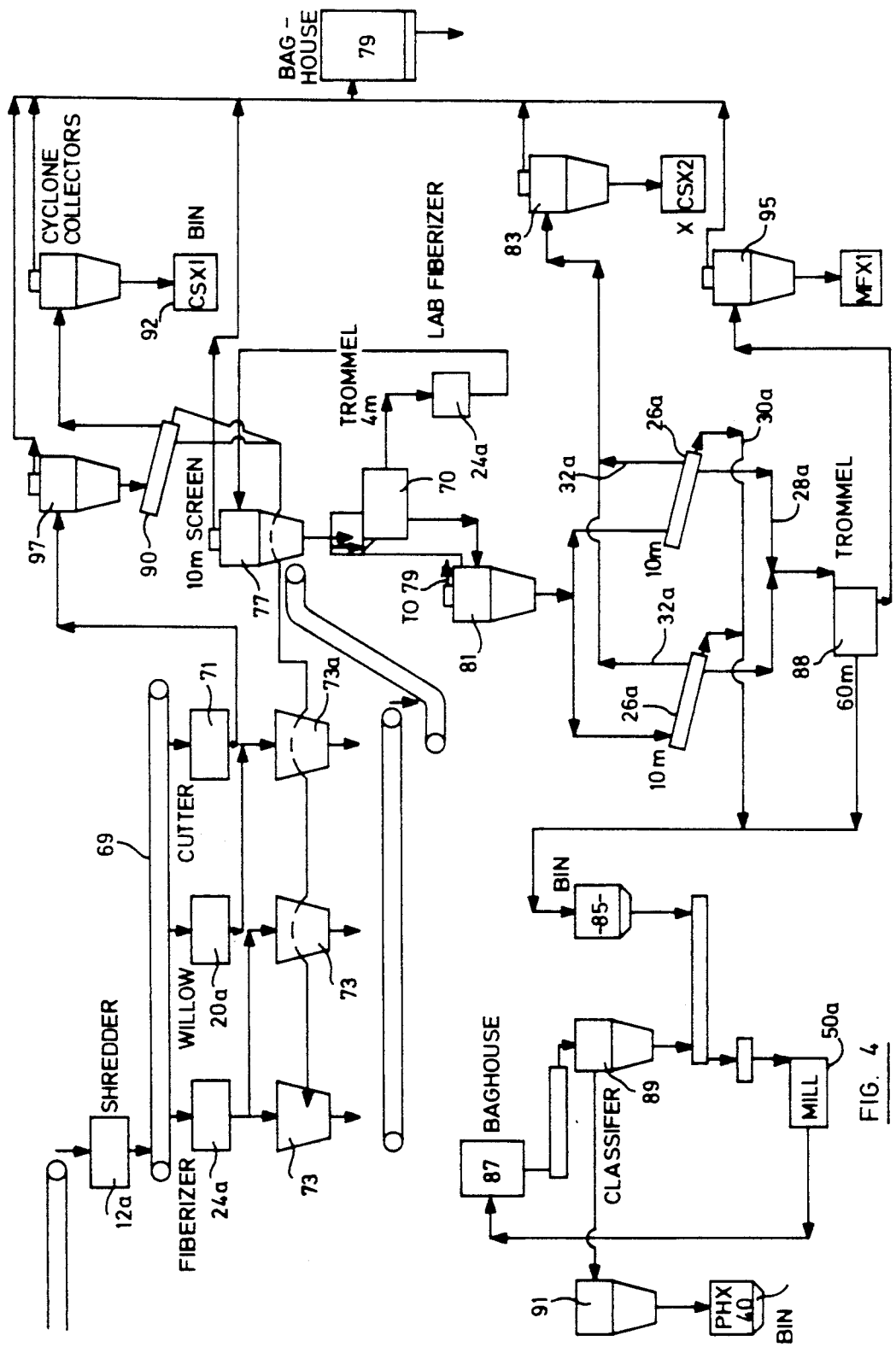
FIG. 4 is a schematic representation of an alternative embodiment of the process shown in FIG. 1.
Figure 5:
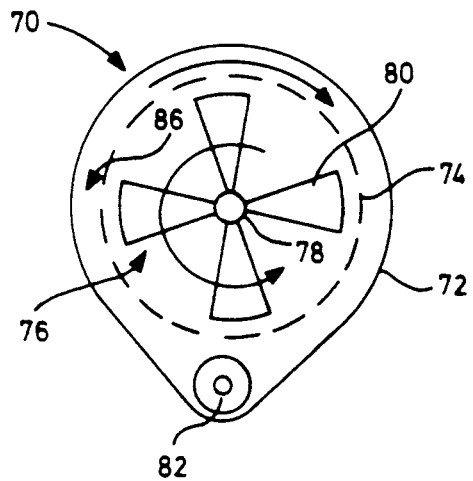
FIG. 5 is a sectional view of a further piece of apparatus used in the process of FIG. 3.

A further process is disclosed in FIGS. 4 and 5 that has been found particularly beneficial with SMC-type product although as shown the apparatus may be used with different types of waste product. Like reference numerals will be used to denote like components with a suffix "a" added for clarity.

In the process of FIG. 4, the waste SMC product is first shredded by shredder 12a into smaller pieces. The output of shredder 12a is discharged onto a conveyor 69 which is selectively operable to direct shredded waste to either a pulverizer 24a, a willow 20a or a cutter 71. Different types of waste have different characteristics so that, for example, some waste will be mainly glass mat which is best processed by the cutter 73. Similarly, some waste has an abundance of free fibre which is best separated by willow 20a. By providing the different devices and the conveyor 71, mixed waste may be processed efficiently and selectively.

Because the SMC waste has few free fibres, the output of shredder 12a is fed to pulverizer 24a identical to that described above. The waste is fed after a single pass through the pulverizer 24a to one of a pair of bins 73 which store the output of the pulverizer and recirculate the product within the bins 73 to obtain a uniform distribution of product within the bin. The output of willow 20a is also fed to a bin 73a for subsequent processing. Product within the bins is then fed by conveyors 75 to a first separation stage performed by a trommel 70.

Trommel 70 comprises a stationary housing 72 with a cylindrical sieve 74 rotatably mounted within the housing 72 for rotation about a generally horizontal axis. A paddle array 76 including a shaft 78 and paddles 80 is also rotatably mounted within the housing 72 so as to be coaxial with the sieve 74. A motor rotates sieve 74 in one direction and the paddle array 76 in the opposite direction so that the sieve 74 and paddles 80 contra-rotate. Air is introduced into the centre of the sieve 74 and flows radially outwardly through the sieve 74 as indicated by the arrow 86.

The output of pulverizer 24a from bin 73 is fed to the interior of the sieve 74 where the free fibre and smaller particles of resin pass through the sieve to be collected at the bottom of the housing 72 and discharged by an auger 82. It has been observed with SMC waste that the output of the pulverizer 24a includes a relatively high percentage, typically 5% to 10% by weight, of larger discrete pieces of SMC product. These pieces, colloquially referred to as "medallions", are typically the size of coins, i.e. 1 cm to 3 cm diameter and the thickness of the waste material. The presence of the medallions is believed to inhibit the separation of fibres on an orbital vibrating sieve but it has been found surprisingly that the contra-rotation of the sieve 74 and paddles 80 in the trommel promote the separation of the fibres. It has been observed that the relatively aggressive agitation of the waste by the paddles 80 as it rolls around the sieve 74 allows the fibres to be orientated by the air stream to pass radially through the sieve 74 while leaving the medallions within the sieve 74. For optimum separation, the paddles 80 should be relatively close to the sieve 74 and may touch the sieve 74 if flexible paddle ends are provided. Typically a spacing of less than 12 mm is preferred although the spacing may be adjusted in the air flow through the sieve 74 to provide the aggressive action within the sieve and the orientation of the fibres in the air stream. A 4.5 mesh (approximately ¼") sieve has been found effective for this separation. Thus fibres that may be up to 1" long will be oriented by the air-stream to pass through the screen but larger pieces or medallions are left.

The medallions are removed from the centre of the sieve 74 and are recampaigned through a pulverizer 24a. As shown in FIG. 4, a second pulverizer 24a may be used and the product passed through a cyclone classifier 77 before being fed back to the trommel 70. The air from the classifier 77 is discharged through bag filters 79 that collect dust and small particles. Alternatively, the overs of trommel 70 may be recampaigned through the first pulverizer 24a and reprocessed through bins 73. The medallions may constitute between 5% and 15% of the waste product fed to the pulverizer 24a.

The unders from the trommel 70—that is, the product that passes through the sieve 74—is fed through a classifier 81 to a 10 mesh orbital screen 26a similar to that described above. The classifier 81 also receives the air that flows through the trommel 70 so that any fibres entrapped in the air stream are further separated and fed to screen 26a. The screen 26a separates the fibres and resin with the free fibres being lifted from the surface of the screen 26a by airlift 32a. The fibres recovered are passed through a classifier 83 to separate dust and are then suitable for further use having a consistency equivalent to that of 1 inch chopped strand.

The overs 30a from the screen 26a that consist mainly of resin are fed via a bin 85 to a grinding mill 50a for grinding into a filler. The output of grinding mill 50a is filtered in a baghouse 87 and the solids classified in a cyclone classifier 89. The solids below the cut size of the classifier 89 are collected in bin 93 for use as a resin filler. The solids larger than the cut size of the classifier 89 are combined with the output of bin 85 to provide a feed for grinding mill 50a.

The unders 28a from screen 26a consist of shorter fibres and resin and are fed to a further separation device provided by a second trommel 88. The trommel 88 is similar to trommel 70 and so will not be described in detail. The sieve of trommel 88 is a 60 mesh sieve and operates to separate the short fibres from the resin. Again, the action of the trommel 88 has been found beneficial in achieving an efficient separation with resin being retained within the sieve and fed to the bin 85 of grinding mill 50a. The shorter fibres that pass through the sieve are collected after dedusting by classifier 95 and have been found to have a consistency equivalent to that of milled fibre.

The waste product from the cutter 71 is fed directly into a deduster 97 and then applied to 10 mesh screen 90. Free fibre is air lifted off the screen 90 and collected in bin 92 where it has a consistency of chopped strand. The unders and overs from screen 90 are fed back to the bin 73 to serve as a feed stock for the trommel 70.

It will be seen therefore that the process shown in FIG. 4 provides a simple continuous process that effectively recovers fibres from the SMC waste relying upon mechanical separation at each stage.

In initial testing with the process of FIG. 4, the fibres recovered from airlift 32a were found to be 31% of the waste feed by weight with 7.2% of the waste feed being recovered as medallions from the trommel 70 and 8.5% being recovered from the overs 30a of the 10 mesh screen 26a.

In the subsequent processing in the trommel 88, 10%–15% of the feed stock to the trommel was recovered as fibres and the balance was fed to the mill 50a.

Figure 6:
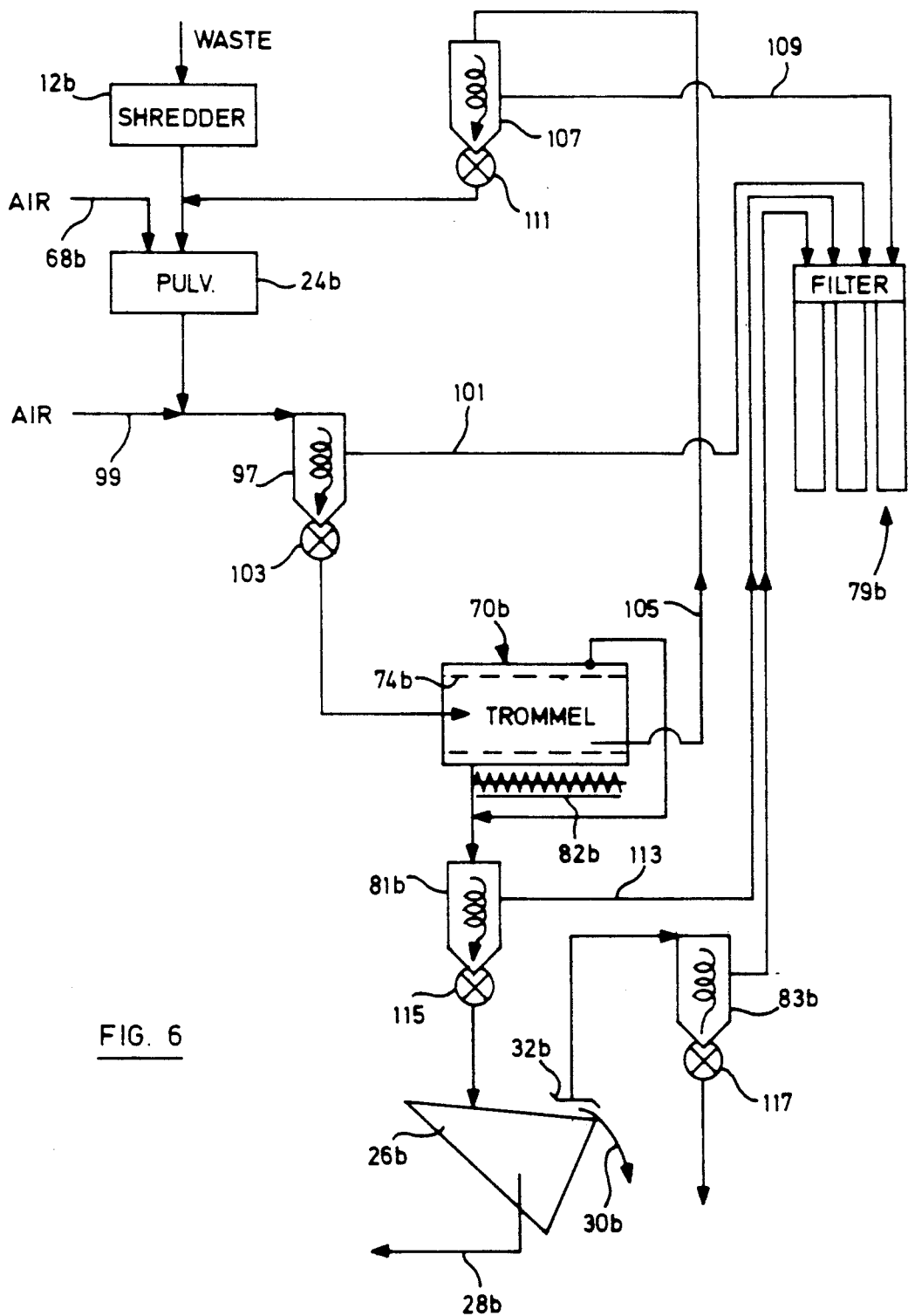
FIG. 6 is a schematic representation of further embodiment of the process shown in FIGS. 1 and 4.

A further embodiment of a process to separate glass fibres is shown in FIG. 6 with like reference numerals to those used in FIG. 1 denoting like components with a suffix b added for clarity. The embodiment shown in FIG. 6 is has been used to process successfully up to 1800 pounds per hour of SMC waste with in the order of 1500 pounds per hour providing an optimal throughput. As such, the embodiment of FIG. 6 provides a useful indication of the performance attainable from the process described above.

Referring therefore to FIG. 6, waste SMC product is fed to a shredder 12b and into a pulverizer 24b. The nature of the SMC waste is such that significant free fibre is not produced in the shredder 12b can be fed directly to the pulverizer 24b. An airstream 68b is also fed to the pulverizer 24b and the unclassified output supplied to a cyclone classifier 97. A secondary airstream 99 assists in the transportation of the output from the pulverizer 24b to the classifier 97. The classifier 97 removes dust from the unclassified output and transfers it through an air duct 101 to the filter 79b.

The classified output of the separator 97 passes through an airlock 103 and is supplied to the trommel 70b. Trommel 70b operates as described above with respect of FIG. 4 with the throughs including the free fibre and the particulate resin being collected and delivered to a cyclone classifier 81b. Again the throughs are collected from the auger 82b and from the entrainment of fibres in the airstream passing through the sieve 74b and are combined prior to entry into the classifier 81b. The overs from the trommel 70b are fed through the recovery line 105 to a separator 107. The separator 107 feeds the fine particles through an air duct 109 to the filter 79b. The output of the separator 107 passes through an airlock 111 and into the feed for the pulverizer 24b. The recampaigned overs or medallions can amount to up to 10% of the feedstock for the pulverizer 24b.

The classifier 81b separates the fine particles through an air duct 113 for collection in the filter house 79b. The fibres and particulate resin are fed through the airlock 115 of classifier 81b to the 10-mesh screen 26b.

As described above with respect to the 10-mesh screen 26b, the throughs 28b are fed for further separation of the shorter fibres as described above with FIG. 4 or with FIG. 1. The overs 30b from the 10-mesh screen are found to be essentially resin particles and are directed to the mill 50b for reduction into fine powder. The free fibres are lifted through the air lift 32b and directed to a separator 83b where the fine particulate material is extracted and transferred to the filter house 79b and the fibre product transferred through the airlock 117 for use as a recovered product.

Figure 7:
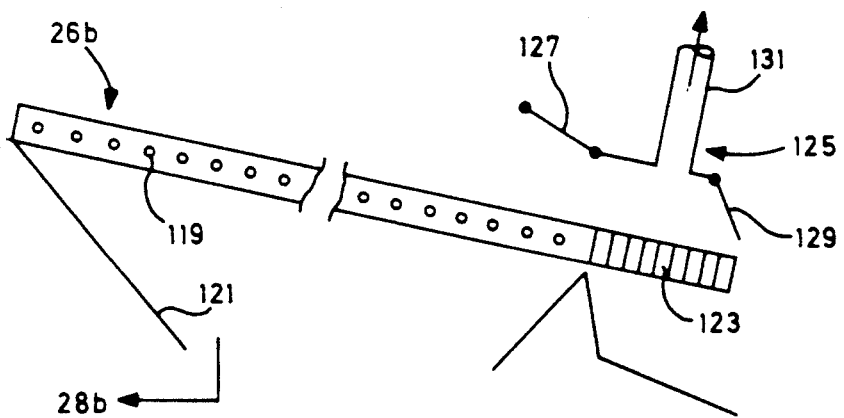
FIG. 7 is an enlarged schematic representation of a screen used in the embodiment shown in FIG. 6.

The airlift 32b and the operation of the 10-mesh screen 26b is shown in further detail in FIG. 7.

Referring therefore to FIG. 7, the screen 26b supports an open mesh 119 and is vibrated to encourage particulate material to pass through the mesh 119. The screen 26b is vibrated by means of an orbital motion at its upper edge and is constrained to move in a generally reciprocal motion at its lower edge. The particulate material passing through the mesh 119 is collected in a hopper 121 and transferred as the throughs 28b for further processing.

The lower edge of the screen 26b is formed as a perforated plate 123 with perforations significantly greater than those of the mesh 119. An airlift housing 125 is positioned over the perforated plate 123 and has a pivoted leading flap 127 and a pivoted trailing flap 129 secured to an air duct 131. A fan (not shown) draws air through the duct 131 to entrain free fibre and lift it from the screen 26b.

The airlift housing 125 is positioned a relatively large distance from the surface of the screen 26b typically in the order of six inches and the flaps 127,129 orientated to encourage fibres to be entrained at the trailing edge, i.e. adjacent the flap 129, of the screen 26b. In operation it has been found that as the throughs of the trommel 70b are deposited on the mesh 119, the throughs are separated leaving free fibre and the overs progressively moving along the mesh 119. As the free fibre and overs pass across the perforated plates 123, the overs pass quickly through the perforations 123 thereby increasing the concentration of the fibres above the mesh 26b. The fibres are lifted from the trailing edge after maximum separation has occurred and thus are relatively clean when transferred to the cyclone separator 83b. Any material left on the perforated plate is discharged over the trailing edge beneath the flat 129 for further processing as described above.

Exemplary results using the apparatus shown in FIG. 6 as set out below.

| | % of Shredder Output by Weight |
|---|---|
| Throughput | |
| Output of shredder | 100% |
| Recampaigned trommel overs | 10% |
| Net throughput of pulverizer 24b (typically 1500 lb/hr) | 110% |
| Recovery | |
| Trommel overs (medallions) | 10% |
| 10 mesh screen airlift (fibre) | 20% |
| 10 mesh overs (resin) | 15% |
| 10 mesh throughs (fibres + resin) | 55% |
| Dust recovery in filter 79b (from all stages) | 10% |

The fibres recovered from the airlift typically have a 40% glass content by weight and have a consistency equivalent to that of 25 mm. chopped strand. The throughs 28b have been found to have a significant glass content of shorter fibres typically 35% glass content with the balance being resin and calcium carbonate filler.

The throughs 28b have been further processed on a 40-mesh screen similar to that shown at 34 in FIG. 1 but without an airlift.

The following results were obtained, expressed as percentages of the shredder output:

| | |
|---|---|
| 40 mesh overs (fibre + resin) | 30% |
| 40 mesh throughs | 25% |

An analysis of the 40-mesh overs shows a glass content of 35% by weight with a consistency similar to that of 8 mm milled fibre, 27% calcium carbonate filler and 32% resin.

The 40-mesh throughs have a 28% glass content with a consistency similar to a 3 mm milled fibre, 41% calcium carbonate filler and 31% resin.

Further processing of the 40-mesh overs and throughs will therefore yield additional glass product with the resin and filler being processed by the mill 50 for use as a filler.

We claim:

1. A method of separating fibres from a fibre reinforced plastic material comprising the steps of shredding said material into a plurality of discrete pieces, feeding said pieces into a pulverizer to impact said pieces, and providing an unclassified output from said pulverizer, separating free fibres from said output and feeding at least a portion of the balance of said output to a pulverizer for further diminution thereof.

2. A method according to claim 1 wherein said free fibres are separated by passing said output across a sieve and lifting said free fibres from said sieve by an air stream.

3. A method according to claim 2 wherein said sieve classifies said output relative to a nominal size and the portion of said output greater than said nominal size is fed to a pulverizer for further separation after removal of said free fibres.

4. A method according to claim 3 wherein the portion of said output below said nominal size is passed to a further separation device and free fibre separated thereby is removed by entrainment with an air stream.

5. A method according to claim 2 wherein said pieces are forced through said pulverizer by entrainment in an air stream.

6. A method according to any preceding claim wherein said pulverizer includes impact elements rotatable within a housing and said material passes through said housing in direction generally parallel to the axis of rotation of said elements.

7. A method according to claim 6 wherein said axis of rotation is oriented vertically.

8. A method according to claim 7 wherein material flows vertically downward through said housing.

9. A method according to claim 8 wherein said pulverizer includes a shaft rotatable about said axis and hammers connected to said shaft and swingable about respective axes spaced from but parallel to the axis of rotation.

10. A method according to claim 9 wherein said hammers are arranged in a plurality of layers spaced along the axis of rotation and stationary fingers are interposed between said layers.

11. A method according to any preceding claim wherein a sieve is located between said shredder and said pulverizer and material passing through said sieve bypasses said pulverizer.

12. A method according to claim 2 wherein free fibres lifted from said sieve are classified by a further sieve to separate particulate material entrapped within said fibres.

13. A method according to claim 12 wherein free fibre separated on said further sieve is lifted therefrom.

14. A method according to claim 13 wherein particulate material greater than the nominal size of said sieve is passed through a pulverizer for further diminution.

15. A method according to claim 14 wherein a trommel is interposed between said sieves to release particulate material entrapped in said fibres.

16. A method according to claim 2 wherein a trommel is located between said pulverizer and said sieve and said free fibres pass through said trommel, larger particulate material being retained by said trommel.

17. A method according to claim 16 wherein said larger particulate material is fed to said pulverizer.

18. A method of separating fibres from a fibre reinforced plastics material comprising the steps of shredding said material into a plurality of discrete pieces, passing said discrete pieces through a pulverizer, separating free fibres from the pulverized material and returning at least a portion of said material to said pulverizer for further diminution.

* * * * *